(12) United States Patent
Duan et al.

(10) Patent No.: US 8,035,361 B2
(45) Date of Patent: Oct. 11, 2011

(54) BOOST DEVICE FOR VOLTAGE BOOSTING

(75) Inventors: Rou-Yong Duan, Guosing Township (TW); Rong-Da Luo, Cingshuei Township (TW)

(73) Assignee: Hungkuang University, Shalu (TW)

( * ) Notice: Subject to any disclaimer, the term of this patent is extended or adjusted under 35 U.S.C. 154(b) by 420 days.

(21) Appl. No.: 12/389,085

(22) Filed: Feb. 19, 2009

(65) Prior Publication Data

US 2010/0085032 A1 Apr. 8, 2010

(51) Int. Cl.
*G05F 1/00* (2006.01)

(52) U.S. Cl. ........................................ 323/272

(58) Field of Classification Search .................. 323/351, 323/272
See application file for complete search history.

(56) References Cited

U.S. PATENT DOCUMENTS

| | | | | |
|---|---|---|---|---|
| 3,913,000 A * | 10/1975 | Cardwell, Jr. | .................... | 363/20 |
| 4,504,896 A * | 3/1985 | Easter et al. | ................ | 363/21.18 |
| 4,683,529 A * | 7/1987 | Bucher, II | ........................ | 363/44 |
| 7,298,118 B2 * | 11/2007 | Chandrasekaran | ........... | 323/222 |
| 7,382,113 B2 * | 6/2008 | Wai et al. | ....................... | 323/222 |
| 2007/0096700 A1 * | 5/2007 | Weng et al. | .................... | 323/222 |

* cited by examiner

*Primary Examiner* — Adolf Berhane
*Assistant Examiner* — Yemane Mehari
(74) *Attorney, Agent, or Firm* — Choate, Hall & Stewart LLP

(57) ABSTRACT

A boost device boosts an input voltage to an output voltage across an output capacitor, and includes first and second output diodes coupled to the output capacitor, and a transformer coupled to first and second switches, first and second switching circuits, and to the first and second output diodes, and receiving the input voltage. The first and second switches are operated alternately in an ON-state, and have overlapping duty cycles. The first and second switching circuits are operable to suppress conduction losses for the first and second switches. The transformer has a bi-directional magnetic circuit. Electric energy is transformed through induced currents of the transformer, and a small amount of energy attributed to an exciting current of the transformer is used for voltage boosting, thereby attaining a relatively high output power.

10 Claims, 15 Drawing Sheets

BOOST DEVICE FOR VOLTAGE BOOSTING

BACKGROUND OF THE INVENTION

1. Field of the Invention

The invention relates to a boost device, more particularly to a DC-to-DC boost device.

2. Description of the Related Art

Referring to FIG. 1, a conventional boost device is shown to include an inductor 11, a switch 12, a diode 13, and a capacitor 14. The inductor 11 has a first end coupled to an external power source, and a second end. The switch 12, such as a semiconductor power switch, has a first terminal coupled to a common node between the second end of the inductor 11 and an anode of the diode 13, a second terminal coupled to ground, and a control terminal for receiving an external control signal such that the switch 12 is operable between an ON-state and an OFF-state in response to the external control signal. The capacitor 14 is coupled between a cathode of the diode 13 and ground.

When the switch 12 is operated in the ON-state, a current from the external power source flows through the inductor 11 to store electric power. When the switch 12 is operated in the OFF-state, the capacitor 14 is charged with a current from the inductor 12 through the diode 13 such that the conventional boost device outputs an output voltage, i.e., a voltage across the capacitor 14, to a load.

The following are some of the drawbacks of the conventional boost device:

1. When the switch 12 is in the OFF-state, a voltage across the switch 12 is substantially equal to the output voltage. Therefore, if the switch 12 is implemented as a MOSFET device, a relatively large conducting impedance is exhibited by the MOSFET device, thereby resulting in a relatively large conduction loss.

2. When the switch 12 is switched from the OFF-state to the ON-state, a reverse bias surge current is generated to flow through the switch 12 that causes serious switching loss, thereby reducing power transformation efficiency.

3. The conventional boost device has a relatively small boost ratio due to the presence of the inductor 11. Therefore, an input voltage converted from solar energy or supplied by a rechargeable battery set of a motor-driven vehicle is not suitably boosted by the conventional boost device.

Referring to FIG. 2, another conventional boost device is shown to include a coupling inductor 15, a switch 16, a diode 17, and an output capacitor 18. The coupling inductor 15 has first and second windings 151, 152, each of which has a polarity end and a non-polarity end. The polarity end of the first winding 151 is coupled to an external power source. The switch 16 has a first terminal coupled to a common node between the non-polarity end of the first winding 151 and the polarity end of the second winding 152, a second terminal coupled to ground, and a control terminal for receiving an external control signal such that the switch 16 is operable between an ON-state and an OFF-state in response to the external control signal. The diode 17 has an anode coupled to the non-polarity of the second winding 152, and a cathode. The capacitor 18 is coupled between the cathode of the diode 17 and ground.

When the switch 16 is operated in the ON-state, a current from the external power source flows through the first winding 151 such that the first winding 151 is excited to store electric power. When the switch 16 is operated in the OFF-state, energy stored in the coupling inductor 15 charges the output capacitor 18 through the second winding 152 and the diode 17 such that the conventional boost device outputs an output voltage, i.e., a voltage across the output capacitor 18, to a load.

The following are some of the drawbacks of the conventional boost device of FIG. 2:

1. When the switch 16 is switched from the ON-state to the OFF-state, a voltage is generated as a result of a leakage inductance of the coupling inductor 15 and can cause damage to the switch 16. As such, an additional snubber circuit is required to absorb energy attributed to the leakage inductance.

2. When the switch 16 is switched from the OFF-state to the ON-state, a relatively large current flows through the switch 16, thereby resulting in a relatively large conduction loss. As a result, the power transformation efficiency of the conventional boost device is reduced.

3. A boost ratio of the conventional boost device is limited to a winding ratio of the second and first windings 152, 151. Therefore, an input voltage converted from solar energy is not suitably boosted by for the conventional boost device.

SUMMARY OF THE INVENTION

Therefore, an object of the present invention is to provide a boost device that has relatively high boost ratio and power transformation efficiency and that can overcome the aforesaid drawbacks of the prior art.

According to an embodiment of the present invention, there is provided a boost device for boosting an input voltage supplied by an external power source to an output voltage. The boost device comprises:

a transformer having first, second, third and fourth windings each having a polarity end and a non-polarity end, the polarity end of the first winding being adapted to be coupled to the external power source and being coupled to the non-polarity end of the third winding, the non-polarity end of the first winding being coupled to the polarity end of the second winding, the polarity end of the third winding being coupled to the non-polarity end of the fourth winding;

an output capacitor having a first terminal and a grounded second terminal, the output voltage being a voltage across the output capacitor;

a first output diode having an anode coupled to the non-polarity end of the second winding of the transformer, and a cathode coupled to the first terminal of the output capacitor;

a second output diode having an anode coupled to the polarity end of the fourth winding of the transformer, and a cathode coupled to the first terminal of the output capacitor;

a first switch coupled between ground and a first common node between the non-polarity end of the first winding and the polarity end of the second winding;

a second switch coupled between ground and a second common node between the polarity end of the third winding and the non-polarity end of the fourth winding;

each of the first and second switches being operable to switch between an ON-state and an OFF-state, the first and second switches being operated alternately in the ON-state, duration of the ON-state of one of the first and second switches overlapping duration of the ON-state of the other one of the first and second switches;

a first switching circuit coupled among the first common node, the anode of the first output diode and ground; and a second switching circuit coupled among the second common node, the anode of the second output diode and ground.

When the first switch is in the ON-state and the second switch is in the OFF-state, the first switching circuit is operable to establish a ground path for the anode of the first output diode therethrough, and the second switching circuit is operable to disconnect the anode of the second output diode from the second common node and ground.

When the first switch is in the OFF-state and the second switch is in the ON-state, the second switching circuit is operable to establish a ground path for the anode of the second output diode therethrough, and the first switching circuit is operable to disconnect the anode of the first output diode from the first common node and ground.

When the first and second switches are in the ON-state, the first switching circuit is operable to disconnect the anode of the first output diode from the first common node and ground, and the second switching circuit is operable to disconnect the anode of the second output diode from the second common node and ground.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION

Figure 1:
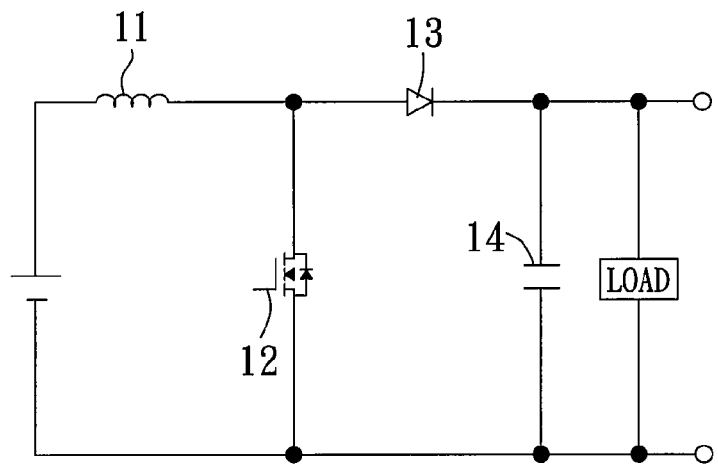
FIG. 1 is a schematic electrical circuit diagram illustrating a conventional boost device.
Figure 2:
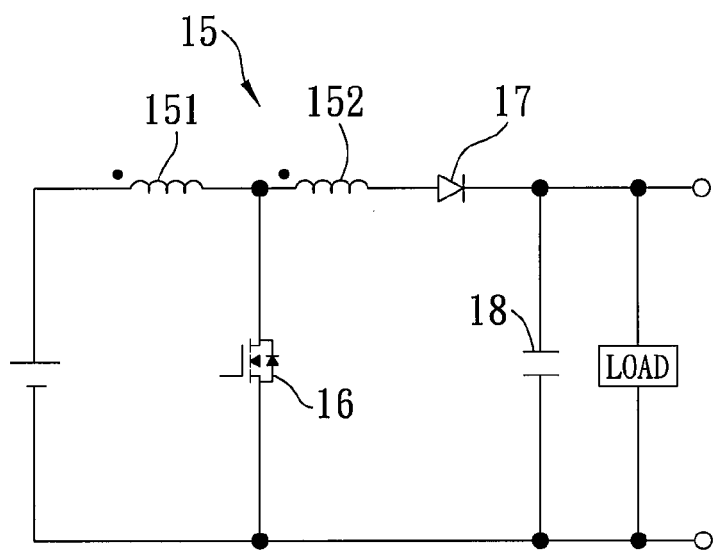
FIG. 2 is a schematic electrical circuit diagram illustrating another conventional boost device.
Figure 3:
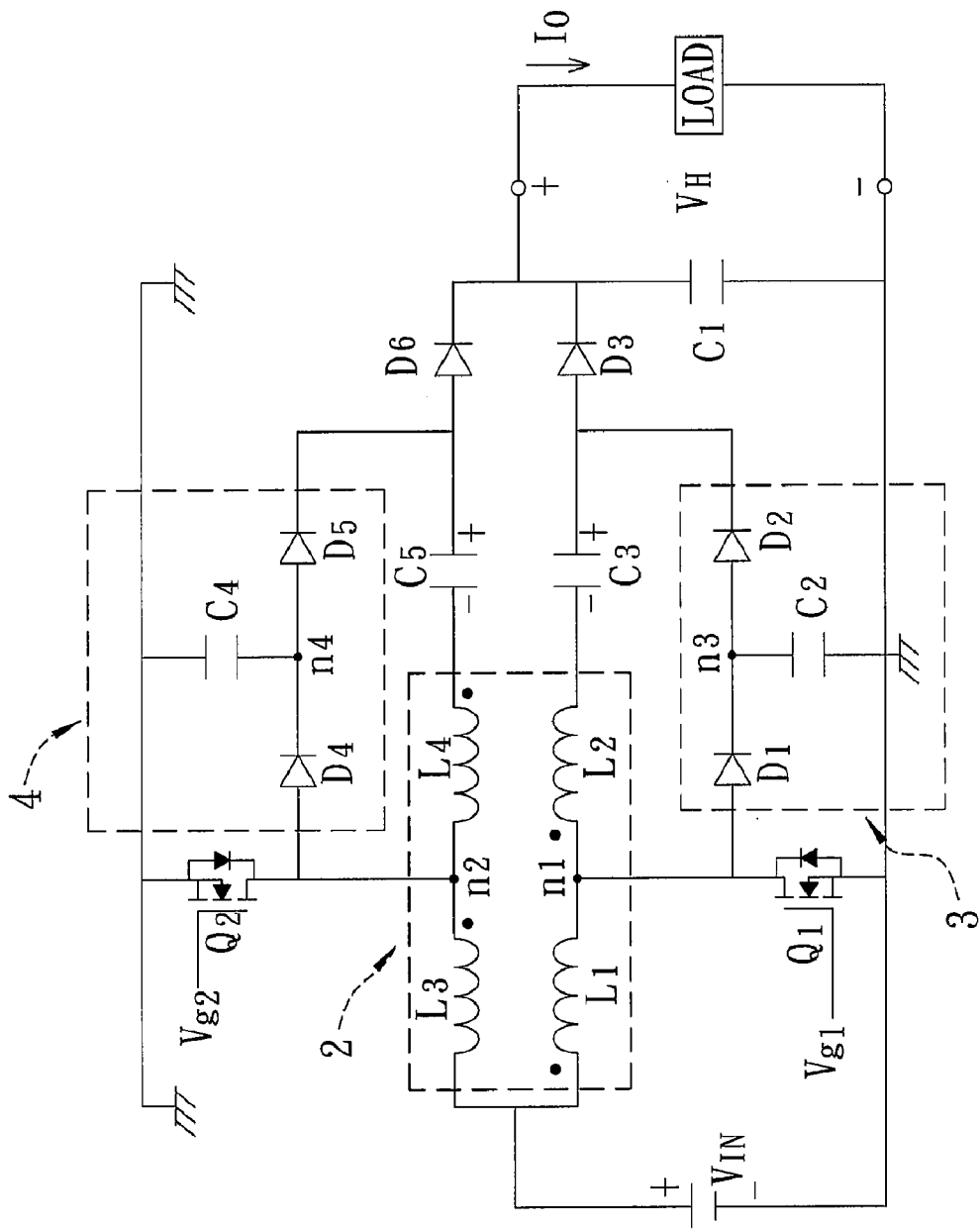
FIG. 3 is a schematic electrical circuit diagram illustrating an embodiment of a boost device.

Referring to FIG. 3, an embodiment of a boost device is shown to be adapted for boosting an input voltage ($V_{IN}$) supplied by an external source to an output voltage ($V_H$). The boost device includes a transformer 2, a first switch ($Q_1$), a second switch ($Q_2$), an output capacitor ($C_1$), a first switching circuit 3, a second switching circuit 4, a first boost capacitor ($C_3$), a second boost capacitor ($C_5$), a first output diode ($D_3$), and a second output diode ($D_6$).

The transformer 2 includes first, second, third and fourth windings ($L_1$, $L_2$, $L_3$, $L_4$) wound around an iron core (not shown). A winding ratio of the first, second, third and fourth windings ($L_1$, $L_2$, $L_3$, $L_4$) is equal to 1:N:1:N. Each of the first, second, third and fourth windings ($L_1$, $L_2$, $L_3$, $L_4$) has a polarity end and a non-polarity end. The polarity end of the first winding ($L_1$) is adapted to be coupled to the external power source, and is coupled to the non-polarity end of the third winding ($L_3$). The non-polarity end of the first winding ($L_1$) is coupled to the polarity end of the second winding ($L_2$). The polarity end of the third winding ($L_3$) is coupled to the non-polarity end of the fourth winding ($L_4$).

The output capacitor ($C_1$) is adapted to be coupled to a load in parallel, and has a first terminal and a grounded second terminal. The output voltage is a voltage across the output capacitor ($C_1$).

The first output diode ($D_3$) has a cathode coupled to the first terminal of the output capacitor ($C_1$), and an anode.

The second output diode ($D_6$) has a cathode coupled to the first terminal of the output capacitor ($C_1$), and an anode.

The first boost capacitor ($C_3$) is coupled between the non-polarity end of the second winding ($L_2$) and the anode of the first output diode ($D_3$).

The second boost capacitor ($C_5$) is coupled between the polarity end of the fourth winding ($L_4$) and the anode of the second output diode ($D_6$).

The first switch ($Q_1$) is coupled between ground and a first common node (n1) between the non-polarity end of the first winding ($L_1$) and the polarity end of the second winding ($L_2$), and has a control end for receiving an external control signal ($V_{g1}$). The first switch ($Q_1$) is operable to switch between an ON-state and an OFF-state in response to the external control signal ($V_{g1}$).

The second switch ($Q_2$) is coupled between ground and a second common node (n2) between the polarity end of the third winding ($L_3$) and the non-polarity end of the fourth winding ($L_4$), and has a control end for receiving an external control signal ($V_{g2}$). The second switch ($Q_2$) is operable to switch between an ON-state and an OFF-state in response to the external control signal ($V_{g2}$).

Figure 4:
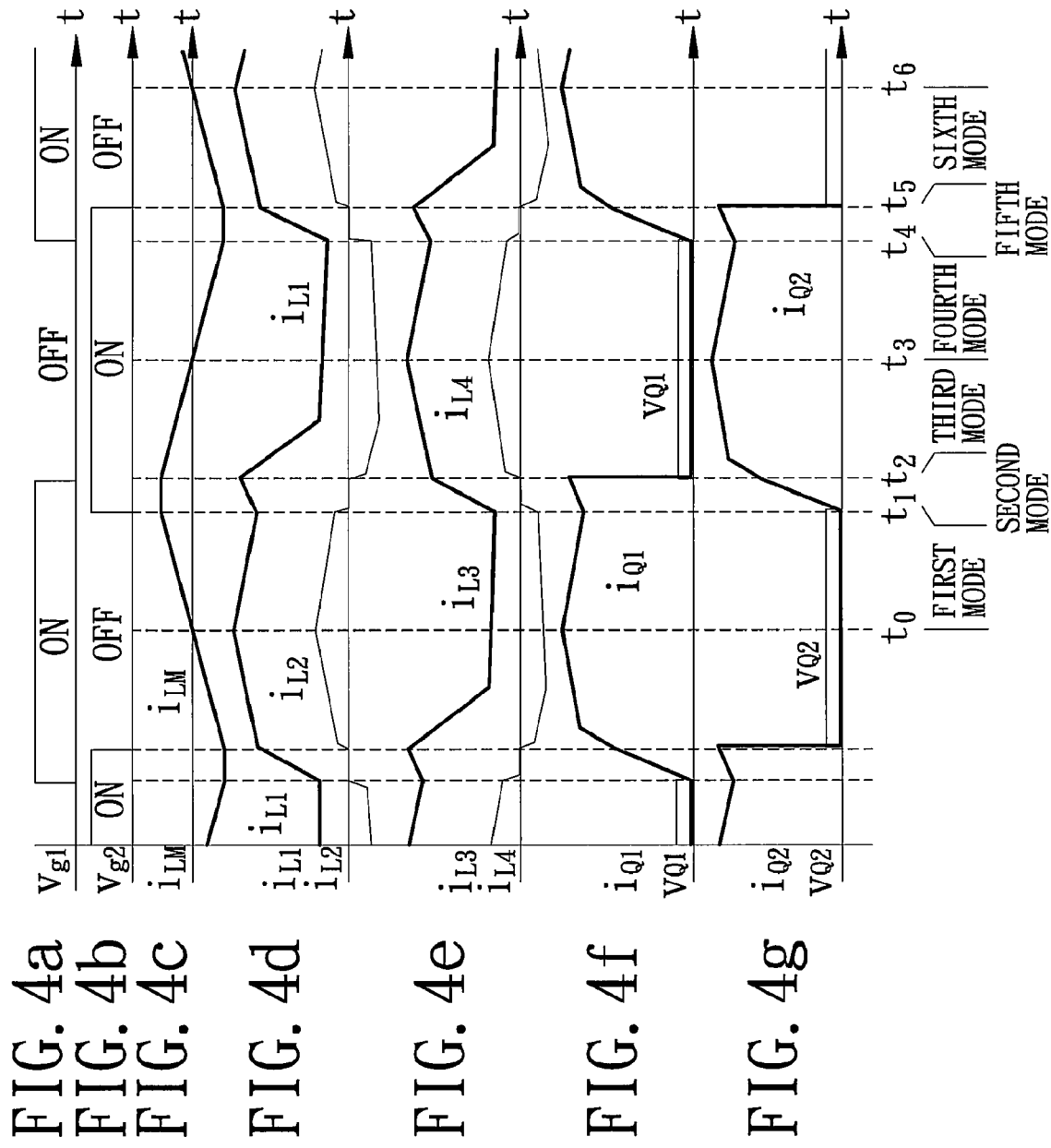
FIGS. 4a and 4b illustrate waveforms of first and second control signals ($V_{g1}$, $V_{g2}$) for first and second switches of the an embodiment of a boost device, respectively.
FIG. 4c illustrates a waveform of an exciting current ($i_{LM}$) of a transformer of the an embodiment of a boost device.
FIG. 4d illustrates waveforms of currents ($i_{L1}$, $i_{L2}$) flowing respectively through first and second windings of the transformer of the an embodiment of a boost device.
FIG. 4e illustrates waveforms of currents ($i_{L3}$, $i_{L4}$) flowing respectively through third and fourth windings of the transformer of the an embodiment of a boost device.
FIG. 4f illustrates waveforms of a current ($i_{Q1}$) flowing through a first switch of the an embodiment of a boost device, and a voltage ($V_{Q1}$) across the first switch.
FIG. 4g illustrates waveforms of a current ($i_{Q2}$) flowing through a second switch of the an embodiment of a boost device, and a voltage ($V_{Q2}$) across the second switch.

It is noted that, based on the external control signals ($V_{g1}$, $V_{g2}$) shown in FIGS. 4a and 4b, the first and second switches ($Q_1$, $Q_2$) are operated alternately in the ON-state, and duration of the ON-state of one of the first and second switches ($Q_1$, $Q_2$) overlaps duration of the ON-state of the other one of the first and second switches ($Q_1$, $Q_2$). Hence, the duty cycle of a combination of the first and second switches ($Q_1$, $Q_2$) is over 100%. In this embodiment, the first and second switches ($Q_1$, $Q_2$) have the same duty cycle, such as 60%.

The first switching circuit 3 is coupled among the first common node (n1), the anode of the first output diode ($D_3$), and ground. In this embodiment, the first switching circuit 3 includes a first clamp diode ($D_1$), a first charge diode ($D_2$), and a first clamp capacitor ($C_2$). The first clamp diode ($D_1$) has an anode coupled to the first common node (n1), and a cathode. The first charge diode ($D_2$) has an anode coupled to the cathode of the first clamp diode ($D_1$), and a cathode coupled to the anode of the first output diode ($D_3$). The first clamp capacitor ($C_2$) is coupled between a third common node (n3) between the cathode of the first clamp diode ($D_1$) and the anode of the first charge diode ($D_2$), and ground.

The second switching circuit 4 is coupled among the second common node (n2), the anode of the second output diode ($D_6$), and ground. In this embodiment, the second switching circuit 4 includes a second clamp diode ($D_4$), a second charge diode ($D_5$), and a second clamp capacitor ($C_4$). The second clamp diode ($D_4$) has an anode coupled to the second common node (n2), and a cathode. The second charge diode ($D_5$) has an anode coupled to the cathode of the second clamp diode ($D_4$), and a cathode coupled to the anode of the second output diode ($D_6$). The second clamp capacitor ($C_4$) is coupled between a fourth common node (n4) between the cathode of the second clamp diode ($D_4$) and the anode of the second charge diode ($D_5$), and ground.

Figure 5:
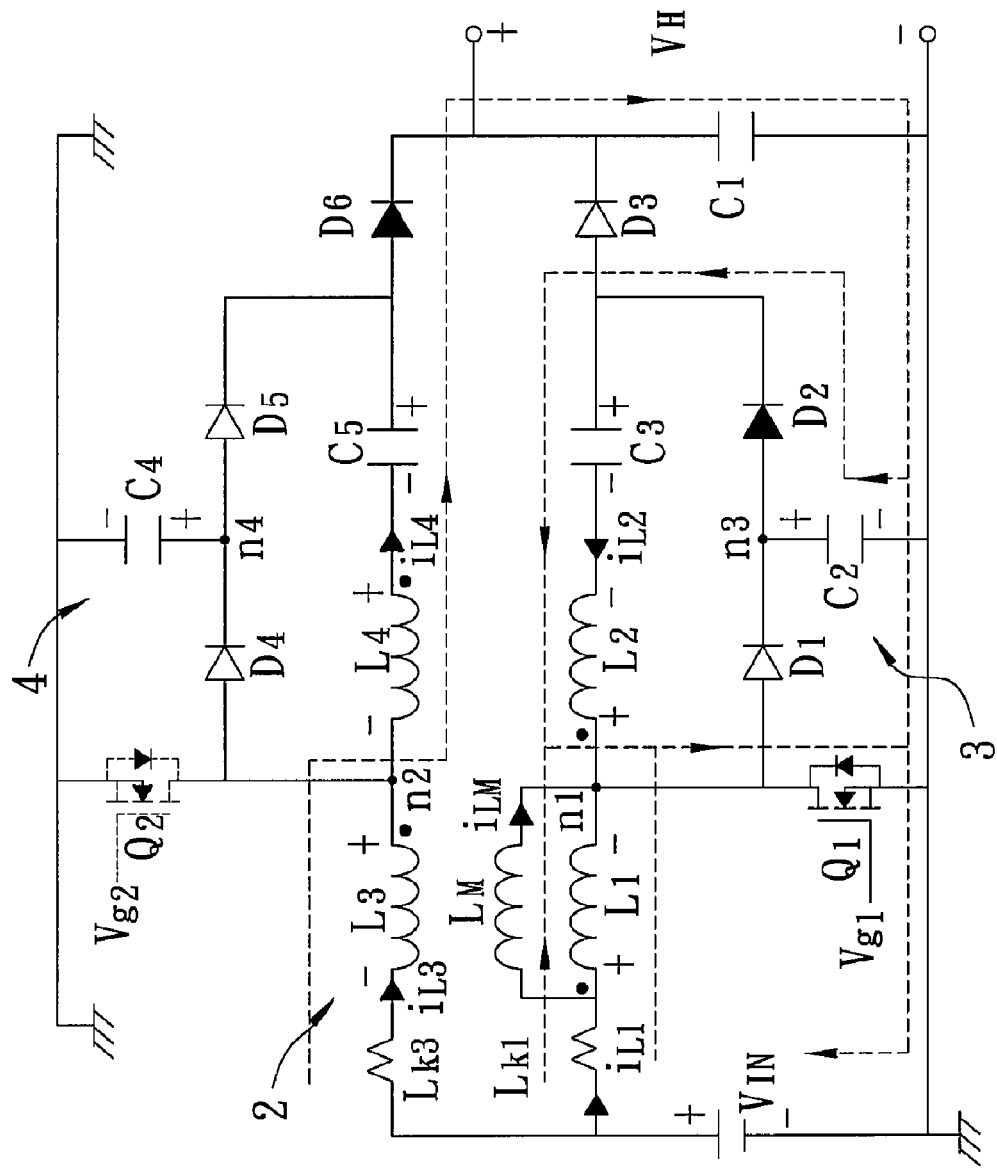
FIG. 5 is a schematic equivalent electrical circuit diagram illustrating an embodiment of a boost device when operated in a first mode.
Figure 10:
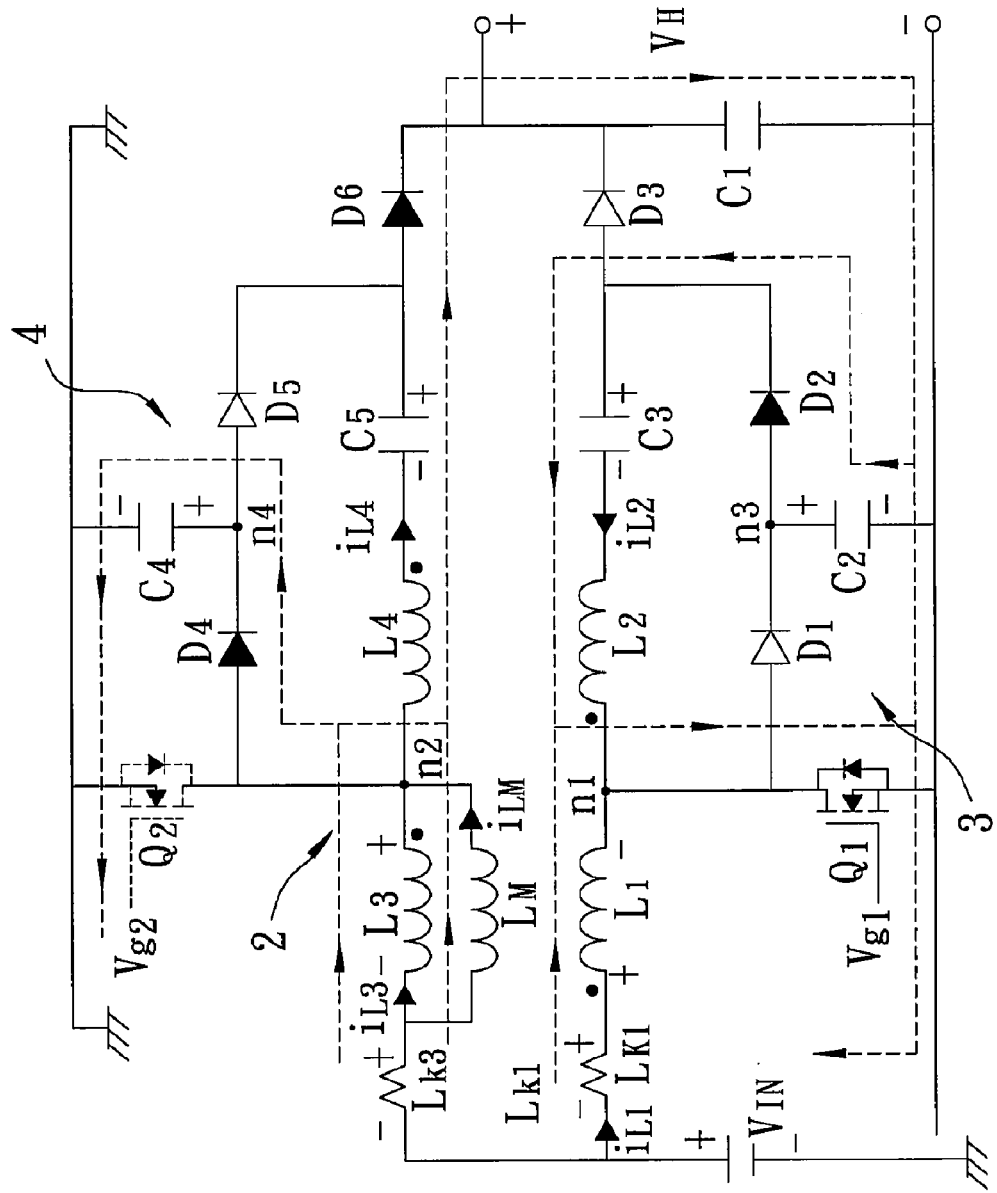
FIG. 10 is a schematic equivalent electrical circuit diagram illustrating an embodiment of a boost device when operated in a sixth mode.

When the first switch ($Q_1$) is in the ON-state and the second switch ($Q_2$) is in the OFF-state, the first switching circuit 3 is operable to establish a ground path for the anode of the first output diode ($D_3$) therethrough, and the second switching circuit 4 is operable to disconnect the anode of the second output diode ($D_6$) from the second common node (n2) and ground, as best shown in FIGS. 5 and 10.

Figure 7:
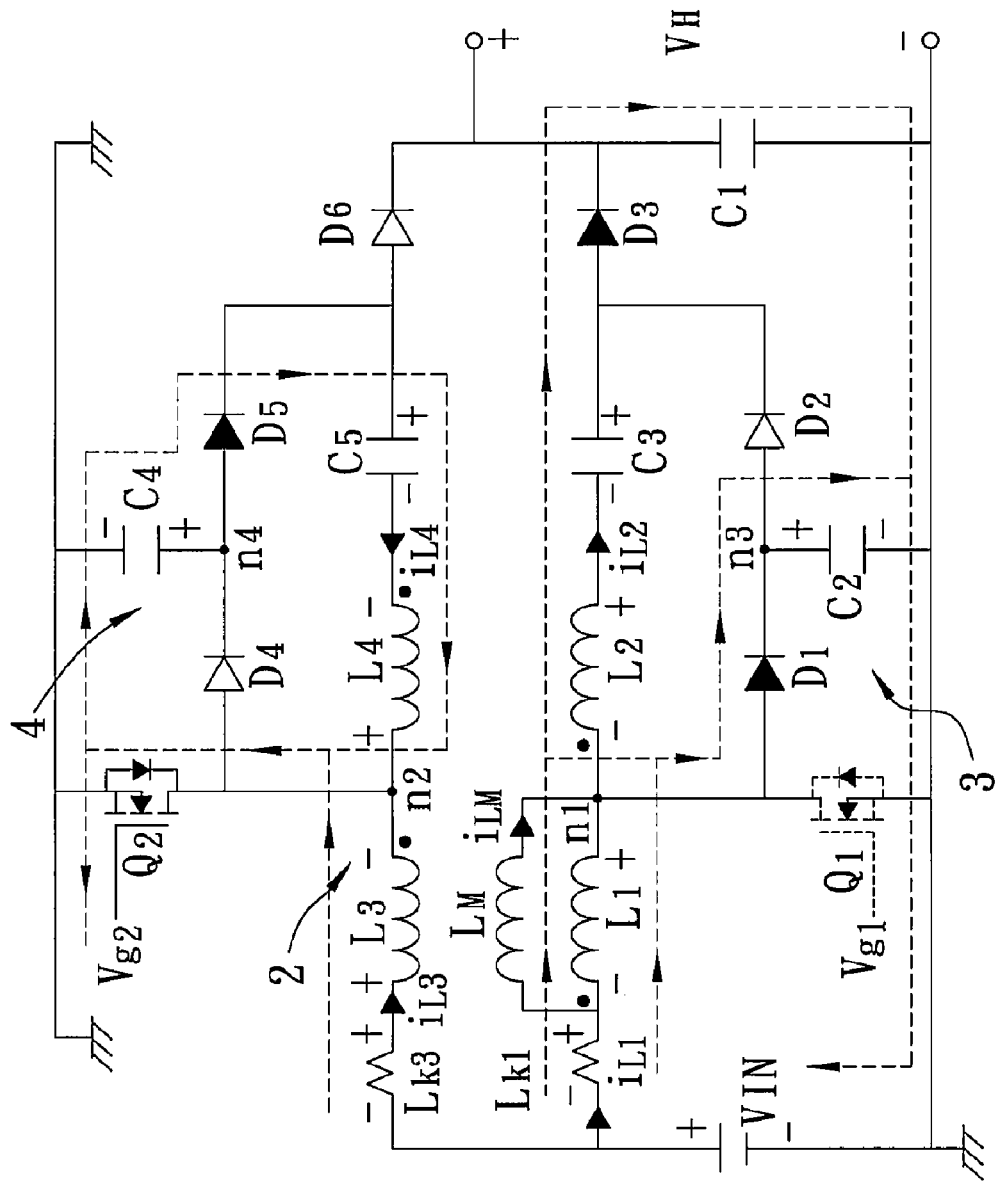
FIG. 7 is a schematic equivalent electrical circuit diagram illustrating an embodiment of a boost device when operated in a third mode.
Figure 8:
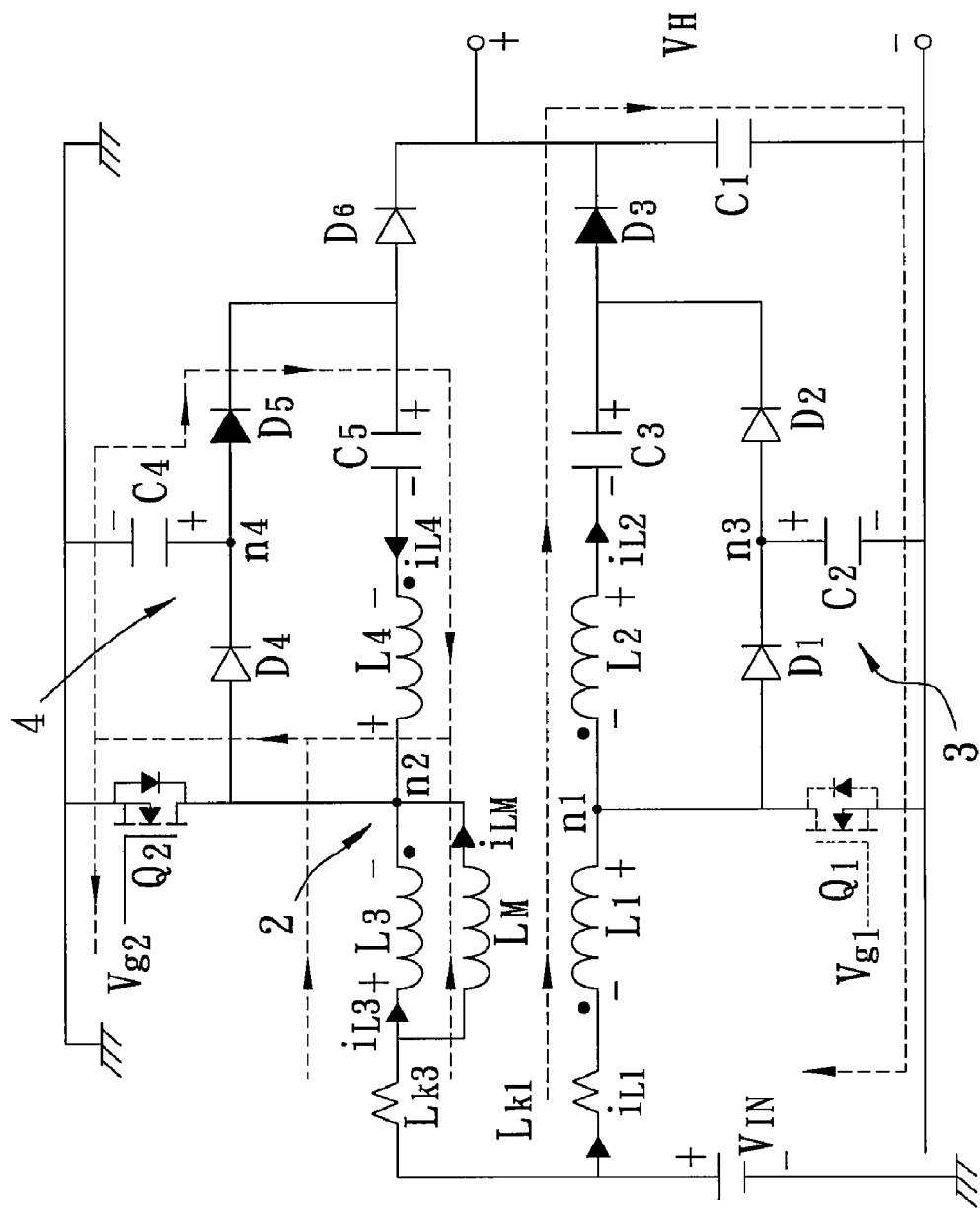
FIG. 8 is a schematic equivalent electrical circuit diagram illustrating an embodiment of a boost device when operated in a fourth mode.

When the first switch ($Q_1$) is in the OFF-state and the second switch ($Q_2$) is in the ON-state, the second switching circuit 4 is operable to establish a ground path for the anode of the second output diode ($D_6$) therethrough, and the first switching circuit 3 is operable to disconnect the anode of the first output diode ($D_3$) from the first common node (n1) and ground, as best shown in FIGS. 7 and 8.

Figure 6:
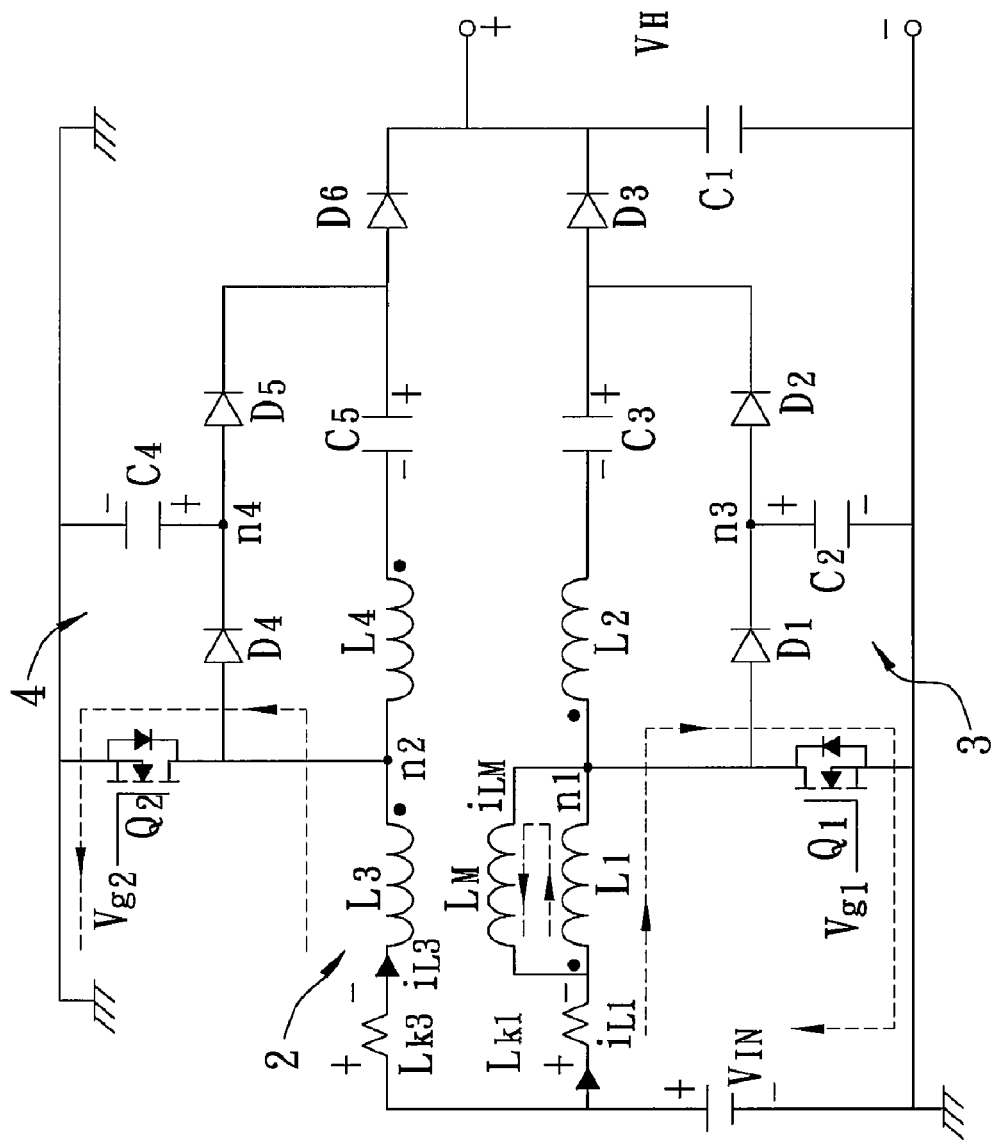
FIG. 6 is a schematic equivalent electrical circuit diagram illustrating an embodiment of a boost device when operated in a second mode.
Figure 9:
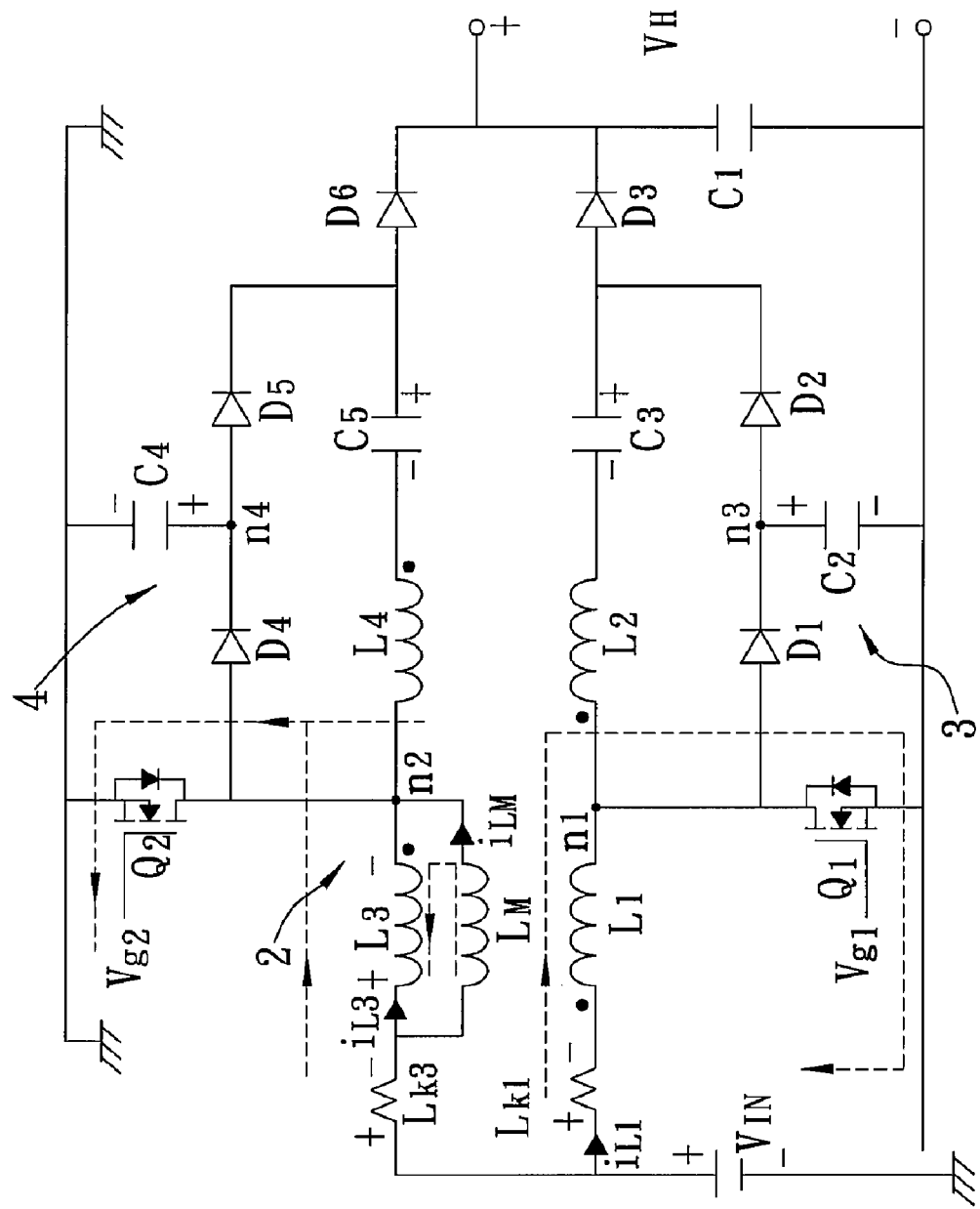
FIG. 9 is a schematic equivalent electrical circuit diagram illustrating an embodiment of a boost device when operated in a fifth mode.

When the first and second switches ($Q_1$, $Q_2$) are in the ON-state, the first switching circuit 3 is operable to disconnect the anode of the first output diode ($D_3$) from the first common node (n1) and ground, and the second switching circuit 4 is operable to disconnect the anode of the second output diode ($D_6$) from the second common node ($N_2$) and ground, as best shown in FIGS. 6 and 9.

In some embodiments, the boost device is operable among first to sixth modes based on the external control signals ($V_{g1}$, $V_{g2}$) for the first and second switches ($Q_1$, $Q_2$) shown in FIGS. 4a and 4b. FIG. 4c illustrates a waveform of an exciting current ($i_{LM}$) of the transformer 2. FIG. 4d illustrates waveforms of currents ($i_{L1}$, $i_{L2}$) flowing respectively through the first and second windings ($L_1$, $L_2$). FIG. 4e illustrates waveforms of currents ($i_{L3}$, $i_{L4}$) flowing respectively through the third and fourth windings ($L_3$, $L_4$). FIG. 4f illustrates waveforms of a current ($i_{Q1}$) flowing through the first switch ($Q_1$), and a voltage ($V_{Q1}$) across the first switch ($Q_1$). FIG. 4g illustrates waveforms of a current ($i_{Q2}$) flowing through the second switch ($Q_2$), and a voltage ($V_{Q2}$) across the second switch ($Q_2$).

Referring further to FIGS. 4a to 4g, and 5, the boost device is operated in the first mode during a period from $t_0$ $t_1$. In FIG. 5, $L_M$ represents an exciting inductance of the transformer 2, $L_{k1}$ represents a leakage inductance of the first winding ($L_1$), and $L_{k3}$ represents a leakage inductance of the third winding ($L_3$). In the first mode, the first switch ($Q_1$) is in the ON-state and the second switch ($Q_2$) is in the OFF-state. The first winding ($L_1$) is excited by a current from the external power source to generate an induced voltage equal to $V_{IN}$ across the first winding ($L_1$). Thus, induced voltages across the second, third and fourth windings ($L_2$, $L_3$, $L_4$) are equal to $NV_{IN}$, $V_{IN}$ and $NV_{IN}$, respectively. In this case, the second winding ($L_2$), the first switch ($Q_1$), the first clamp capacitor ($C_2$) and the first charge diode ($D_2$) of the first switching circuit 3, and the first boost capacitor ($C_3$) form a circuit loop such that the first boost capacitor ($C_3$) is charged through the first charge diode ($D_2$) with the induced voltage across the second winding ($L_2$), and a voltage across the first clamp capacitor ($C_2$) (that is equal to $2V_{IN}$ which will be described in detail later) to $NV_{IN}+2V_{IN}$. Furthermore, since the first and second switches ($Q_2$, $Q_2$) have the same duty cycle, and since an assembly of the first and second windings ($L_1$, $L_2$), the first switch ($Q_1$), the first switching circuit 3, the first boost capacitor ($C_3$), and the first output diode ($D_3$) is symmetrical to an assembly of the third and fourth windings ($L_3$, $L_4$), the second switch ($Q_2$), the second switching circuit 4, the second boost capacitor ($C_5$), and the second output diode ($D_6$), a voltage across the second boost capacitor ($C_5$) corresponds to the voltage across the first boost capacitor ($C_3$), and is equal to $NV_{IN}+2V_{IN}$ that will be described in detail later. Thus, the output capacitor ($C_1$) is charged through the second output diode ($D_6$) with the input voltage ($V_{IN}$), the induced voltage across the third winding ($L_3$), the induced voltage across the fourth winding ($L_4$) and the voltage across the second boost capacitor ($C_5$) to $V_{IN}+V_{IN}+NV_{IN}+(NV_{IN}+2V_{IN})=(4+2N)\ V_{IN}$. That is, the output voltage ($V_H$) is equal to $(4+2N)V_{IN}$. Thus, a boost ratio (G) of the boost device is represented by $V_H/V_{IN}=4+2N$.

Referring to FIG. 6, the boost device is operated in the second mode during a period from $t_1$ to $t_2$. In the second mode, the first and second switches ($Q_1$, $Q_2$) are in the ON-state. In this case, the potential of the second common node (n2) is reduced to zero such that a voltage across the leakage inductance ($L_{k3}$) of the third winding ($L_3$) becomes a sum of the input voltage ($V_{IN}$) and the induced voltage across the third winding ($L_3$). Thus, the current ($i_{L3}$) flowing through the third winding ($L_3$) increases at a slope of $2V_{IN}/L_{k3}$, as shown in FIG. 4e. Since the leakage inductance ($L_{k3}$) of the third winding ($L_3$) is much less than the exciting inductance ($L_M$), the leakage inductance ($L_{k3}$) of the third winding ($L_3$) is charged with the increased current ($L_{k3}$). Energy induced by the first winding ($L_1$) is transformed to the third winding ($L_3$) due to conduction of the first switch ($Q_1$) such that the current ($i_{L1}$) flowing through the first winding ($L_1$) slightly increases. The currents ($i_{L2}$, $I_{L4}$) flowing through the second and fourth windings ($L_2$, $L_4$) are reduced to zero.

Referring to FIG. 7, the boost device is operated in the third mode during a period from $t_2$ to $t_3$. In the third mode, the first switch ($Q_1$) is in the OFF-state and the second switch ($Q_2$) is in the ON-state. When the first switch ($Q_1$) is switched from the ON-state to the OFF-state while the second switch ($Q_2$) is in the ON-state, the first switching circuit 3 is operable to establish the ground path for the first common node (n1) through the first clamp diode ($D_1$) and the first clamp capacitor ($C_2$), and potential of the first common node (n1) quickly rises such that a voltage across the leakage inductance ($L_{k1}$) of the first winding ($L_1$) greatly increases up to $V_{IN}$. Thus, the first winding ($L_1$) and the first clamp capacitor ($C_2$) are charged with the input voltage ($V_{IN}$) and the voltage across the leakage inductance ($L_{k1}$) of the first winding ($L_1$), and the voltage ($V_{C2}$) across the first clamp capacitor ($C_2$) is charged to $2V_{IN}$. In this case, the first clamp capacitor ($C_2$) receives energy attributed to the leakage inductance ($L_{k1}$) of the first winding ($L_1$). A voltage ($V_{Q1}$) across the first switch ($Q_1$) is equal to the voltage ($V_{C2}$) across the first clamp capacitor ($C_2$) and is clamped to $2V_{IN}(=V_H/(2+N))$. Furthermore, the fourth winding ($L_4$), the second switch ($Q_2$), the second clamp capacitor ($C_4$) and the second charge diode ($D_5$) of the second switching circuit 4, and the second boost capacitor ($C_5$) form a circuit loop such that the second boost capacitor ($C_5$) is charged through the second charge diode ($D_5$) with the induced voltage across the fourth winding ($L_4$) and the voltage across the second clamp capacitor ($C_4$). Furthermore, the output capacitor ($C_1$) is charged through the first charge diode ($D_3$) with the induced voltages across the first and second windings ($L_1$, $L_2$), and the voltage across the first boost capacitor ($C_3$).

Referring to FIG. 8, the boost device is operated in the fourth mode during a period from t3 to t4. In the fourth mode, the first switch ($Q_1$) is in the OFF-state and the second switch ($Q_2$) is in the ON-state. When the exciting current ($i_{LM}$) of the transformer 2 is reduced to zero, the boost device is switched from the third mode to the fourth node. In this case, the energy attributed to the leakage inductance ($L_{k1}$) of the first winding ($L_1$) is released, and the exciting current ($i_{LM}$) of the transformer 2 is reversed. Thus, the first clamp diode ($D_1$) does not conduct due to reverse bias. Furthermore, the second boost capacitor ($_{C5}$) is continuously charged with the induced voltage across the fourth winding ($L_4$) (equal to $NV_{IN}$) and a voltage across the second clamp capacitor ($C_4$) to $NV_{IN}+2V_{IN}$. The output capacitor ($C_1$) is charged through the first charge diode ($D_3$) with the induced voltages across the first and second windings ($L_1$, $L_2$), and the voltage across the first boost capacitor ($C_3$).

Referring to FIG. 9, the boost device is operated in the fifth mode during a period from $t_4$ to $t_5$. In the fifth mode, the first and second switches ($Q_1$, $Q_2$) are in the ON-state. Since operations of the boost device in the fifth mode are similar to those in the second mode, details of the same are omitted herein for the sake of brevity.

Referring to FIG. 10, the boost device is operated in the sixth mode during a period from $t_5$ to $t_6$. In the sixth mode, the first switch ($Q_1$) is in the ON-state and the second switch ($Q_2$) is in the OFF-state. When the second switch ($Q_2$) is switched from the ON-state to the OFF-state while the first switch ($Q_1$) is in the ON-state, the second switching circuit 4 is operable to establish the ground path for the second common node (n2) through the second clamp diode ($D_4$) and the second clamp capacitor ($C_4$), and potential of the second common node (n2) quickly rises such that a voltage across the leakage inductance ($L_{k3}$) of the third winding ($L_3$) greatly increases up to $V_{IN}$. Thus, the third winding ($L_3$) and the second clamp capacitor ($C_4$) are charged with the input voltage ($V_{IN}$) and the voltage across the leakage inductance ($L_{k3}$) of the third winding ($L_3$), and the voltage ($V_{C4}$) across the second clamp capacitor ($C_4$) is charged to $2V_{IN}$. In this case, the second clamp capacitor ($C_4$) receives energy attributed to the leakage inductance ($L_{k3}$) of the third winding ($L_3$). A voltage ($V_{Q2}$) across the second switch ($Q_2$) is equal to the voltage ($V_{c4}$) across the second clamp capacitor ($C_4$) and is clamped to $2V_{IN}$. Furthermore, the second winding ($L_2$), the first switch ($Q_1$), the first clamp capacitor ($C_2$) and the first charge diode ($D_2$) of the first switching circuit 3, and the first boost capacitor ($C_3$) form a circuit loop such that the first boost capacitor ($C_3$) is charged through the first charge diode ($D_2$) with the induced voltage across the second winding ($_{L2}$) and the voltage across the first clamp capacitor ($C_2$). Furthermore, the output capacitor ($C_1$) is charged through the second charge diode ($D_6$) with the induced voltages across the third and fourth windings ($L_3$, $L_4$), and the voltage across the second boost capacitor ($C_5$). Thereafter, when the exciting current ($i_{LM}$) of the transformer 2 becomes zero, the boost device is switched from the sixth mode to the first node.

FIGS. 11 to 18 illustrate experimental measurement results when an embodiment of the boost device is operated under the input voltage ($V_{IN}$) of 3.7V, the output voltage ($V_H$) of 36V and an output power of 300 W.

Figure 11:
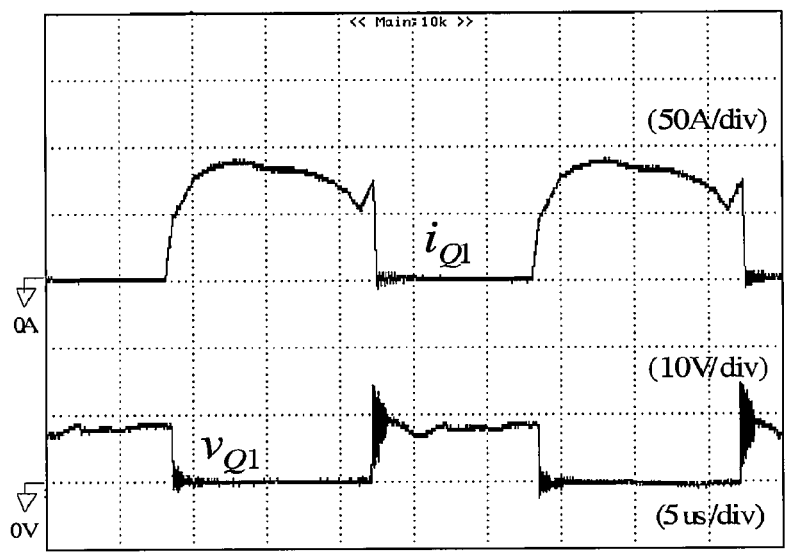
FIG. 11 is a plot illustrating experimental measurement results of the current ($i_{Q1}$) flowing though the first switch and the voltage ($V_{Q1}$) across the first switch.

As shown in FIG. 11, the voltage ($V_{Q1}$) across the first switch ($Q_1$) is clamped to about 8V, i.e., about double the input voltage ($V_{IN}$). The waveform of the current ($i_{Q1}$) flowing through the first switch ($Q_1$) is substantially of a square shape. The first switch ($V_{IN}$) has soft switch characteristics during transformation from the OFF-state to the ON-state. Therefore, the switching loss and conduction loss for the first switch ($Q_1$) are effectively reduced.

Figure 12:
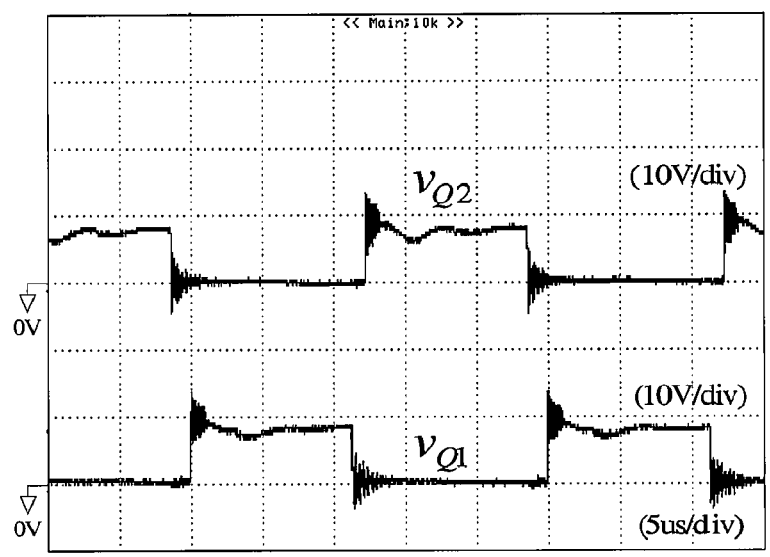
FIG. 12 is a plot illustrating experimental measurement results of the voltages ($V_{Q1}$, $V_{Q2}$) across the first and second switches.

As shown in FIG. 12, when the voltages ($V_{Q1}$, $V_{Q2}$) across the first and second switches ($Q_1$, $Q_2$) are zero, the first and second switches ($Q_1$, $Q_2$) are in the ON-state.

Figure 13:
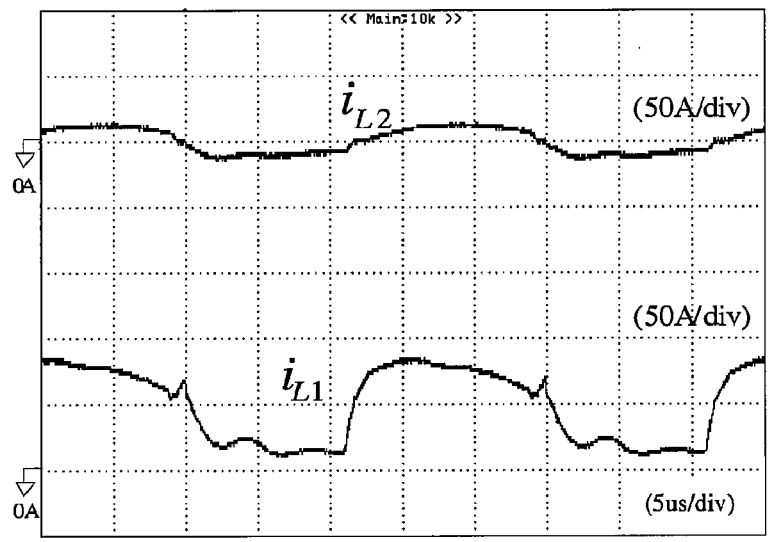
FIG. 13 is a plot illustrating experimental measurement results of the currents ($i_{L1}$, $i_{L2}$) flowing respectively through first and second windings of the transformer.

As shown in FIG. 13, since the current ($i_{L1}$) flowing through the first winding ($L_1$) contains current components resulting in the currents flowing through the third and fourth windings ($L_3$, $L_4$), the current ($i_{L1}$) flowing through the first winding ($L_1$) is much greater than N times the current ($i_{L2}$) flowing through the second winding ($L_2$). In this experiment, the boost ratio is about 10 (=4+2N), and thus, N is equal to 3.

Figure 14:
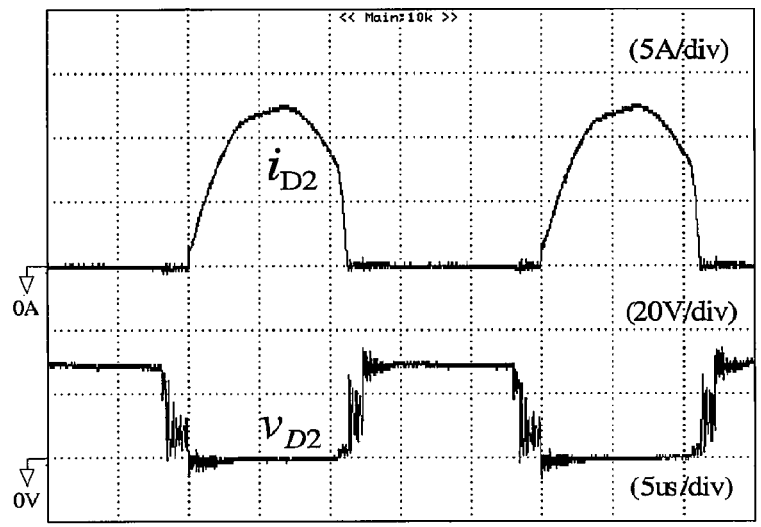
FIG. 14 is a plot illustrating experimental measurement results of a voltage ($V_{D2}$) across a first charge diode of an embodiment of a boost device, and a current ($i_{D2}$) flowing through the first charge diode.

As shown in FIG. 14, a voltage ($V_{D2}$) across the first charge diode ($D_2$) is clamped to about 30V. Thus, a Schottky diode having a low-conducting voltage can be used.

Figure 15:
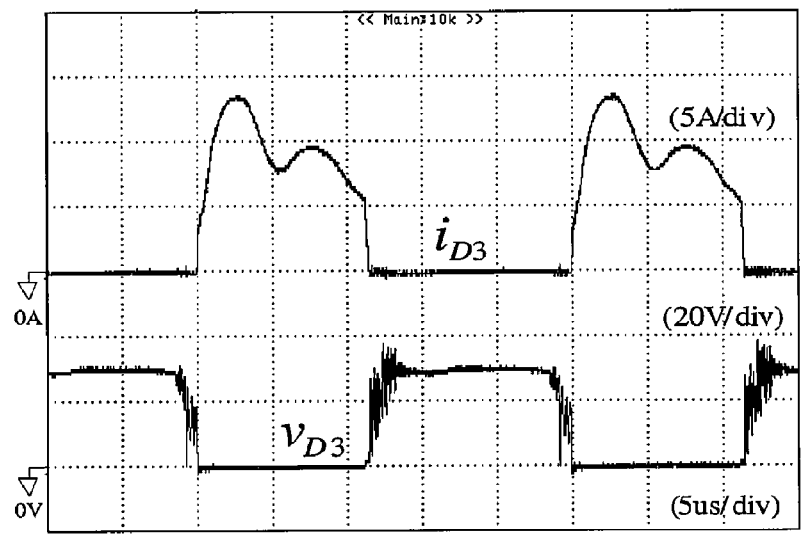
FIG. 15 is a plot illustrating experimental measurement results of a voltage ($V_{D3}$) across a first output diode of an embodiment of a boost device, and a current ($i_{D3}$) flowing through the first output diode.

As shown in FIG. 15, a voltage ($V_{D3}$) across the first output diode ($D_3$) is clamped to about 30V, and a reverse recovery current is suppressed within a very small region.

Figure 16:
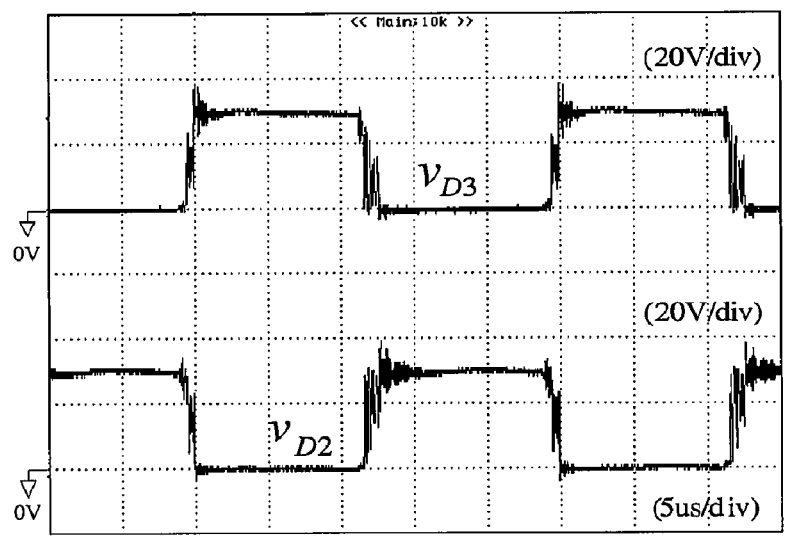
FIG. 16 is a plot illustrating experimental measurement results of the voltages ($V_{D2}$, $V_{D3}$) across the first charge diode and the first output diode.

As shown in FIG. 16, the voltages ($V_{D2}$, $V_{D3}$) across the first charge diode ($D_2$) and the first output diode ($D_3$) are alternately clamped to about 30V that is less than the output voltage ($V_H$) of 36V.

Figure 17:
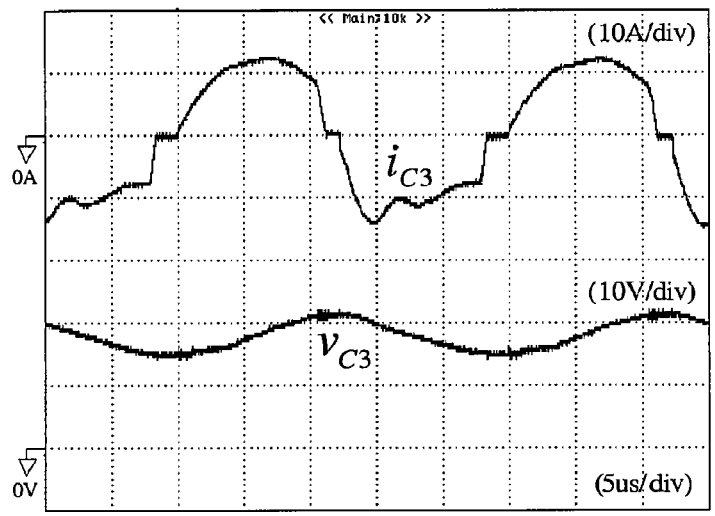
FIG. 17 is a plot illustrating experimental measurement results of a voltage ($V_{C3}$) across a first boost capacitor of an embodiment of a boost device, and a current ($i_{C3}$) flowing through the first boost capacitor.

As shown in FIG. 17, in order to suppress an inrush current, each of the first and second boost capacitors ($C_3$, $C_5$) are designed to have a relatively low equivalent series resistance (ESR) and a relatively small capacitance. Thus, the voltage across the first boost capacitor ($C_3$) has a large ripple, thereby decreasing heat generated by the first boost capacitor ($C_3$).

Figure 18:
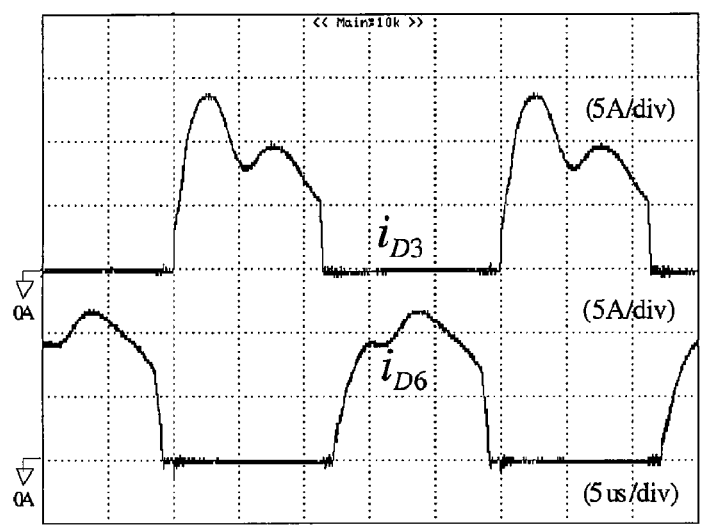
FIG. 18 is a plot illustrating experimental measurement results of a current ($i_{D6}$) flowing through a second output diode of an embodiment of a boost device, and the current ($i_{D3}$) flowing through the first output diode.

As shown in FIG. 18, current ($i_{D3}$, $i_{D6}$) flowing through the first and second output diodes ($D_3$, $D_6$) are alternately outputted by the boost device, and a combination of the current ($i_{D3}$) flowing through the first output diode ($D_3$) and the current ($i_{D5}$) flowing through the second output diode ($D_5$) serves as an output current of the boost device.

Figure 19:
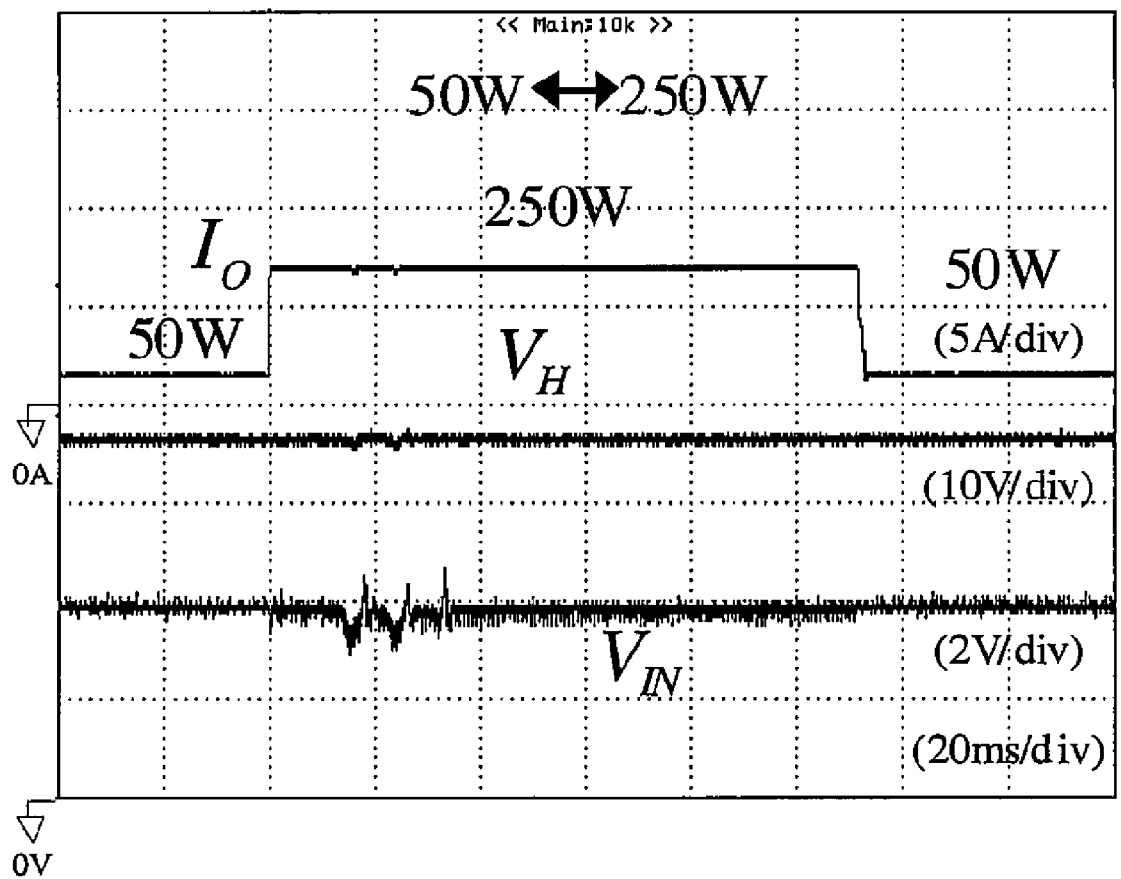
FIG. 19 is a plot illustrating experimental measurement results of an input voltage ($V_{IN}$), an output voltage ($V_H$) boosted by an embodiment of a boost device and a current ($I_O$) flowing through a variable load.

Referring to FIG. 19, the boost device is adapted to be coupled to a variable load so that the output power of the boost device is variable between 50 W and 250 W. In this case, when the input voltage ($V_{IN}$) slightly fluctuates, the output voltage ($V_H$) remains stable even though great variation of the output power occurs.

Figure 20:
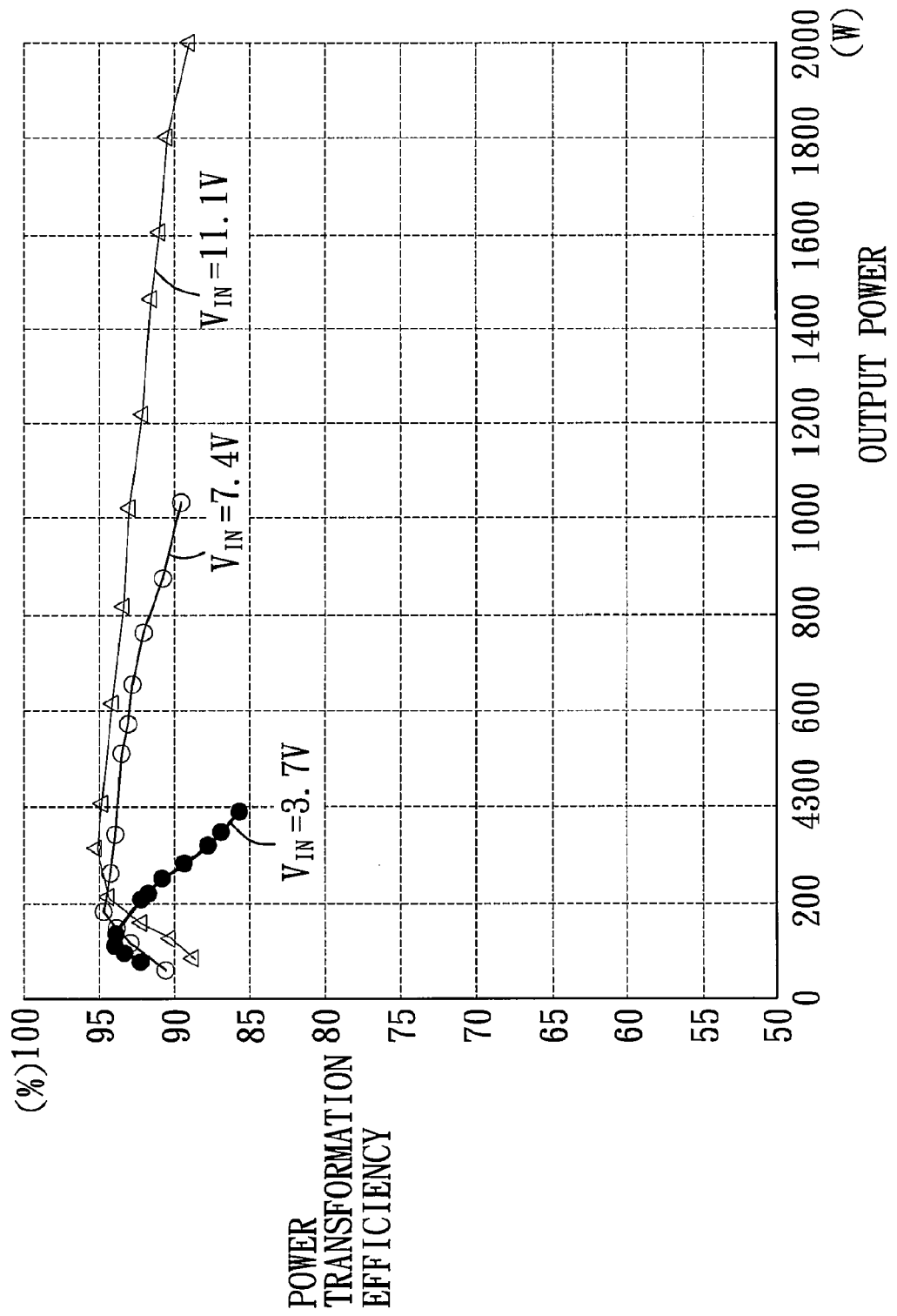
FIG. 20 is a plot illustrating experimental results of power transformation efficiency of embodiment of a boost device for three different input voltages.

FIG. 20 illustrates experimental results of power transformation efficiency an embodiment of the boost device operated under first, second and third conditions, where the input voltage ($V_{IN}$) and the output voltage ($V_H$) are respectively 3.7V and 36V in the first condition, the input voltage ($V_{IN}$) and the output voltage ($V_H$) are respectively 7.4V and 75V in the second condition, and the input voltage ($V_{IN}$) and the output voltage ($V_H$) are respectively 11.1V and 110V in the third condition. In FIG. 20, when the input voltage ($V_{IN}$) is 7.4V or 11.1V while the output power ranges from 0.9 KW to 1.8 KW, the power transformation efficiency is over 90%. When the input voltage ($V_{IN}$) is 11.1V, the boost device has a maximum output power of 2 KW, and a maximum power transformation efficiency of about 95%.

In sum, due to the presence of the first and second switches ($Q_1$, $Q_2$), and the first and second switching circuits 3 and 4, embodiments of the boost device has relatively low conduction loss and switching loss. Since the first and second switches ($Q_1$, $Q_2$) are clamped to $2V_{IN}$ that is less than the output voltage ($V_H$) equal to $(4+2N)V_{IN}$, a MOSFET switch having a low conducting voltage and a low conduction loss can be used for the first and second switches ($Q_1$, $Q_2$), and there is no need for a snubber circuit, thereby resulting in a relatively low cost. Moreover, embodiments of the boost device have a relatively larger boost ratio equal to 4+2N. Therefore, some embodiments of the boost device can be applied with a solar cell or a rechargeable battery set of a motor-driven vehicle.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A boost device for boosting an input voltage supplied by an external power source to an output voltage, comprising:
   a transformer having first, second, third and fourth windings each having a polarity end and a non-polarity end, said polarity end of said first winding being adapted to be coupled to the external power source and being coupled to said non-polarity end of said third winding, said non-polarity end of said first winding being coupled to said polarity end of said second winding, said polarity end of said third winding being coupled to said non-polarity end of said fourth winding;
   an output capacitor having a first terminal and a grounded second terminal, the output voltage being a voltage across said output capacitor;
   a first output diode having an anode coupled to said non-polarity end of said second winding of said transformer, and a cathode coupled to said first terminal of said output capacitor;
   a second output diode having an anode coupled to said polarity end of said fourth winding of said transformer, and a cathode coupled to said first terminal of said output capacitor;
   a first switch coupled between ground and a first common node between said non-polarity end of said first winding and said polarity end of said second winding;
   a second switch coupled between ground and a second common node between said polarity end of said third winding and said non-polarity end of said fourth winding;
   each of said first and second switches being operable to switch between an ON-state and an OFF-state, said first and second switches being operated alternately in the ON-state, duration of the ON-state of one of said first and second switches overlapping duration of the ON-state of the other one of said first and second switches;
   a first switching circuit coupled among said first common node, said anode of said first output diode and ground; and
   a second switching circuit coupled among said second common node, said anode of said second output diode and ground;
   wherein, when said first switch is in the ON-state and said second switch is in the OFF-state, said first switching circuit is operable to establish a ground path for said anode of said first output diode therethrough, and said second switching circuit is operable to disconnect said anode of said second output diode from said second common node and ground;
   wherein, when said first switch is in the OFF-state and said second switch is in the ON-state, said second switching circuit is operable to establish a ground path for said anode of said second output diode therethrough, and said first switching circuit is operable to disconnect said anode of said first output diode from said first common node and ground; and
   wherein, when said first and second switches are in the ON-state, said first switching circuit is operable to disconnect said anode of said first output diode from said first common node and ground, and said second switching circuit is operable to disconnect said anode of said second output diode from said second common node and ground.

2. The boost device as claimed in claim 1, wherein:
   when said first switch is in the ON-state and said second switch is in the OFF-state, said output capacitor is charged through said second output diode with the input voltage, an induced voltage across said third winding, and an induced voltage across said fourth winding; and
   when said first switch is in the OFF-state and said second switch is in the ON-state, said output capacitor is charged through said first output diode with the input voltage, an induced voltage across said first winding, and an induced voltage across said second winding.

3. The boost device as claimed in claim 1, wherein, when said first switch is switched from the ON-state to the OFF-state while said second switch is in the ON-state, said first switching circuit is operable to establish a ground path for said first common node therethrough to clamp a voltage across said first switch.

4. The boost device as claimed in claim 3, wherein said first switching circuit further receives energy attributed to a leakage inductance of said first winding.

5. The boost device as claimed in claim 1, wherein, when said second switch is switched from the ON-state to the OFF-state while said first switch is in the ON-state, said second switching circuit is operable to establish a ground path for said second common node therethrough to clamp a voltage across said second switch.

6. The boost device as claimed in claim 5, wherein said second switching circuit further receives energy attributed to a leakage inductance of said third winding.

7. The boost device as claimed in claim 1, further comprising:
a first boost capacitor coupled between said non-polarity end of said second winding and said anode of said first output diode; and
a second boost capacitor coupled between said polarity end of said fourth winding and said anode of said second output diode.

8. The boost device as claimed in claim 7, wherein:
when said first switch is in the ON-state and said second switch is in the OFF-state, said second winding, said first switch, said first switching circuit, and said first boost capacitor form a circuit loop such that said first boost capacitor is charged with an induced voltage across said second winding; and
when said first switch is in the OFF-state and said second switch is in the ON-state, said fourth winding, said second switch, said second switching circuit, and said second boost capacitor form a circuit loop such that said second boost capacitor is charged with an induced voltage across said fourth winding.

9. The boost device as claimed in claim 1, wherein: said first switching circuit includes
a first clamp diode having an anode coupled to said first common node, and a cathode,
a first charge diode having an anode coupled to said cathode of said first clamp diode, and a cathode coupled to said anode of said first output diode, and
a first clamp capacitor coupled between a third common node between said cathode of said first clamp diode and said anode of said first charge diode, and ground; and
said second switching circuit includes
a second clamp diode having an anode coupled to said second common node, and a cathode,
a second charge diode having an anode coupled to said cathode of said second clamp diode, and a cathode coupled to said anode of said second output diode, and
a second clamp capacitor coupled between a fourth common node between said cathode of said second clamp diode and said anode of said second charge diode, and ground.

10. The boost device as claimed in claim 1, wherein said first and second switches have the same duty cycle.

* * * * *